(12) United States Patent
Xiang et al.

(10) Patent No.: US 12,399,828 B2
(45) Date of Patent: Aug. 26, 2025

(54) CACHE MANAGEMENT METHOD AND STORAGE DEVICE

(71) Applicant: HUAWEI TECHNOLOGIES CO., LTD., Guangdong (CN)

(72) Inventors: Weijie Xiang, Hangzhou (CN); Jinmou Liu, Shenzhen (CN); Junwei Chen, Chengdu (CN); Jinhu Liu, Chengdu (CN); Zhuo Cheng, Zürich (CH)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/470,138

(22) Filed: Sep. 19, 2023

(65) Prior Publication Data

US 2024/0012756 A1  Jan. 11, 2024

Related U.S. Application Data

(63) Continuation of application No. PCT/CN2022/075262, filed on Jan. 30, 2022.

(30) Foreign Application Priority Data

Mar. 26, 2021  (CN) .................. 202110326240.0

(51) Int. Cl.
*G06F 12/0811* (2016.01)
*G06F 12/0877* (2016.01)

(52) U.S. Cl.
CPC ...... *G06F 12/0811* (2013.01); *G06F 12/0877* (2013.01)

(58) Field of Classification Search
None
See application file for complete search history.

(56) References Cited

U.S. PATENT DOCUMENTS

| 10,642,505 B1* | 5/2020 | Kuzmin | G06F 3/0679 |
|---|---|---|---|
| 2014/0013032 A1 | 1/2014 | Min et al. | |
| 2015/0012690 A1* | 1/2015 | Bruce | G06F 12/0844 |
| | | | 711/103 |
| 2018/0136838 A1 | 5/2018 | White et al. | |

FOREIGN PATENT DOCUMENTS

| CN | 104102454 A | 10/2014 |
| CN | 106170757 B | 6/2019 |
| CN | 110858124 A | 3/2020 |
| CN | 111176584 A | 5/2020 |
| CN | 111880745 A | 11/2020 |
| CN | 112286459 A | 1/2021 |

* cited by examiner

*Primary Examiner* — Baboucarr Faal
(74) *Attorney, Agent, or Firm* — Rimon PC

(57) ABSTRACT

Embodiments of this disclosure provide for a storage device, a cache management method, and related apparatus. The storage device includes at least two levels of storages. The at least two levels of storages include a first-level storage and a second-level storage, and a speed of processing data by the first-level storage is higher than that of the second-level storage. The first-level storage includes at least a first storage area and a second storage area. Hotness values of data stored in the first storage area are within a first hotness value interval, hotness values of data stored in the second storage area are within a second hotness value interval, and the data in the first-level storage is swapped out at a granularity of one storage area based on the hotness values of the data.

14 Claims, 8 Drawing Sheets

CACHE MANAGEMENT METHOD AND STORAGE DEVICE

CROSS-REFERENCE TO RELATED APPLICATIONS

This application is a continuation of International Application PCT/CN2022/075262, filed on Jan. 30, 2022, which claims priority to Chinese Patent Application No. 202110326240.0, filed on Mar. 26, 2021. The disclosures of the aforementioned applications are hereby incorporated by reference in their entireties.

TECHNICAL FIELD

This application generally relates to the field of storage technologies, and in particular, to a cache management method and a storage device.

BACKGROUND

With continuous developments in the field of information technologies (ITs), such as big data, artificial intelligence (AI), and internet of things (IoT), there is an increasingly large amount of data that is generated by human social activities. This increasingly large amount of data needs to be stored, which imposes an increasingly high performance requirement on a data storage system.

A cache serves as a key component for improving a performance of a storage system by having an increasingly large cache capacity. This large cache capacity allows for the storage system to meet a requirement for storing large-scale high-performance data. However, due to restrictions caused by high cache costs, how to cache high-value data as much as feasibly possible in a limited space is a challenge in cache technologies. However, as the cache capacity is increases, how to balance a high cache hit rate while reducing management overheads is a problem that needs to be urgently resolved.

SUMMARY

Embodiments of this application provide for a cache management method and a storage device that reduce management overheads while ensuring a high cache hit rate.

According to a first aspect, this application provides a storage device. The storage device includes a processor and at least two levels of storages. The at least two levels of storages include a first-level storage and a second-level storage, and a speed of processing data by the first-level storage is higher than that of the second-level storage. The first-level storage includes at least a first storage area and a second storage area. Hotness values of data stored in the first storage area are within a first hotness value interval, hotness values of data stored in the second storage area are within a second hotness value interval, and the first hotness value interval is different from the second hotness value interval. The processor is configured to swap out the data in the first-level storage at a granularity of one storage area based on the hotness values of the data.

According to the foregoing design, data stored in a same storage area has the same or similar hotness values. When the data is swapped out at the granularity of the storage area, a scenario in which the swapped data is mixed with cold data (e.g., data that is infrequently accessed) and hot data (e.g., data that is frequently accessed) can be avoided. This arrangement also facilitates for a cache hit rate to be improved and management overheads to be reduced by performing cache management at the granularity of the storage area.

In a possible design, the processor is further configured to obtain first data, and determine a first hotness value of the first data. When the first hotness value is within the first hotness value interval, the processor is further configured to store the first data in the first storage area. When the first hotness value is within the second hotness value interval, the processor is further configured to store the first data in the second storage area.

According to the foregoing design, the storage device may allocate, based on the hotness value of the data, the storage area in which the data is located. This allows for the storage device to avoid a situation in which a same storage area is mixed with cold data and hot data. Cold data tends to be stored in lower performing storage devices while hot data tends to be stored in higher performing storage devices. By segregating the cold data from the hot data, the storage device may optimize each of the two levels of storages based on the hotness of the data in each level of storage.

In a possible design, when determining the first hotness value of the first data, the processor is configured to obtain a parameter value that is of the first data and that is recorded in a historical data record. The parameter value includes one or more of the following: an access frequency, access time, a data size, a data validity period, or data priority information. The processor is configured to perform an operation based on a preset algorithm and the parameter value, and use an operation result as the first hotness value.

In a possible design, when swapping out the data in the first-level storage at the granularity of the one storage area, the processor is configured to determine a second hotness value of each of N storage areas, where N is a positive integer, and the N storage areas are some or all storage areas in the first-level storage. The processor is further configured to determine at least one storage area from the N storage areas, where a second hotness value of the at least one storage area is less than a preset threshold. Alternatively, a second hotness value of the at least one storage area may be less than a second hotness value of another storage area, and the other storage area is a storage area other than the at least one storage area in the N storage areas. The processor is further configured to swap out data in the at least one storage area.

In a possible design, each storage area includes a first data structure, the first data structure includes an access parameter record, and the access parameter record is updated when data in the storage area is accessed. When determining the second hotness value of each of the N storage areas, the processor is configured to obtain an access parameter record of any storage area, and determine the second hotness value based on the obtained access parameter record. The access parameter record includes one or more of the following: a total access frequency or access time of data in the storage area.

According to the foregoing design, data stored in a storage area has the same or similar hotness values, and is further managed at a granularity of the storage area, so that management overheads can be reduced while a cache hit rate can be ensured.

According to a second aspect, this application provides a cache management method, where the method may be applied to a storage device. The method includes. providing at least two levels of storages. The at least two levels of storages include a first-level storage and a second-level storage, and a speed of processing data by the first-level storage is higher than that of the second-level storage. The method further includes providing at least a first storage area and a second storage area, where both the first storage area and the second storage area fall within the first-level storage. Hotness values of data stored in the first storage area are within a first hotness value interval, hotness values of data stored in the second storage area are within a second hotness value interval, and the first hotness value interval is different from the second hotness value interval. The method further includes swapping out the data in the first-level storage at a granularity of one storage area based on the hotness values of the data.

In the foregoing method, data with the same or similar hotness values may be stored in a same storage area. This arrangement avoids a scenario in which the swapped out data is mixed with cold data and hot data. This arrangement also facilitates for a cache hit rate to be improved and management overheads to be reduced by performing cache management at the granularity of the storage area.

In a possible design, the method further includes obtaining first data, and determining a first hotness value of the first data. When the first hotness value is within the first hotness value interval, storing the first data in the first storage area. When the first hotness value is within the second hotness value interval, storing the first data in the second storage area. In a possible design, a parameter value that is of the first data and that is recorded in a historical data record is obtained. The parameter value includes but is not limited to one or more of the following: an access frequency, access time, a data size, a data validity period, or data priority information. An operation is performed based on a preset algorithm and the parameter value, and an operation result is used as the first hotness value.

In a possible design, a second hotness value of each of N storage areas is determined, where N is a positive integer, and the N storage areas are some or all of storage areas in the first-level storage. At least one storage area is determined in the N storage areas, where a second hotness value of the at least one storage area is less than a preset threshold. Alternatively, a second hotness value of the at least one storage area is less than a second hotness value of another storage area, and the other storage area is a storage area other than the at least one storage area in the N storage areas. Data in the at least one storage area is swapped out.

In a possible design, each storage area includes a first data structure, the first data structure includes an access parameter record, and the access parameter record is updated when data in the storage area is accessed. An access parameter record of any storage area is obtained, and the second hotness value is determined based on the obtained access parameter record. The access parameter record includes one or more of the following: a total access frequency or access time of data in the storage area.

For the advantageous effects of the method provided in the second aspect and the implementations of the method, refer to the descriptions of the advantageous effects of the storage device in the first aspect and the implementations of the storage device.

According to a third aspect, a storage apparatus is provided. The apparatus includes a processor and a storage. The storage is configured to store program instructions and data. The storage is coupled to the processor. The processor may invoke and execute the program instructions stored in the storage to implement any one of the methods described in the second aspect.

According to a fourth aspect, an embodiment of this application provides a computer-readable storage medium. The computer-readable storage medium stores a computer program, the computer program includes program instructions, and when the program instructions are executed by a computer, the computer is enabled to perform the method according to the second aspect.

According to a fifth aspect, an embodiment of this application provides a computer program product. The computer program product stores a computer program, the computer program includes program instructions, and when the program instructions are executed by a computer, the computer is enabled to perform the method according to the second aspect.

According to a sixth aspect, this application provides a chip system. The chip system includes a processor and a storage, and is configured to implement the method according to the second aspect. The chip system may include a chip, or may include a chip and another discrete device.

For advantageous effects of the third aspect to the sixth aspect and the implementations of the third aspect to the sixth aspect, refer to descriptions of advantageous effects of the method in the first aspect and the implementations of the method.

DESCRIPTION OF EMBODIMENTS

Conventionally, a storage system may typically include a plurality of levels of storages. In an effort to balance cost-reduction while achieving a required performance threshold, a hard disk having a low cost and a low performance is typically configured to persistently store data, while a storage with relatively higher performance is used as a cache layer, and the cache layer is configured to store data with a higher hotness value. In doing so, the storage system may improve a read/write performance while being cost-effective.

In an implementation, a policy of separating metadata (e.g., non-user data generated by a device side due to management of user data) and the user data is used in a data management policy. The metadata is used to record a storage location of the user data in a hard disk to facilitate subsequent searching and locating of the user data to read the user data. Correspondingly, the cache layer may alternatively include a data cache area and a metadata cache area. The data cache area is used to store user data with a high hotness value and the metadata cache area is used to store metadata with a high hotness value.

It should be understood that a read/write speed of the cache layer storage is higher than that of the hard disk. Therefore, for to-be-accessed user data, the processor first queries whether the cache layer is hit, and then accesses a hard disk with a low speed if the cache layer is not hit. For example, a general procedure of reading data may first include determining whether the data is stored in the data cache area is queried. When the data is hit in the data cache area, the data may be read from the data cache area at a high speed. When the data is not hit in the data cache area, metadata of the data needs to be queried to obtain the data from the hard disk. The process may include determining whether the metadata of the data is in the metadata cache area is queried. When the metadata is hit in the metadata cache area, the metadata may be read from the metadata cache area at a high speed, and the data is obtained from the hard disk based on the metadata. When the metadata is not hit in the metadata cache area, the metadata of the data needs to be obtained from the hard disk in order to obtain the data from the hard disk based on the metadata.

Because resources at the cache layer are very limited, methods of enabling the cache layer to store hotspot data as much as feasibly possible to improve a cache hit ratio is always a key technology driver for storage devices. The following uses the metadata cache area as an example to describe two cache management policies.

Figure 1:
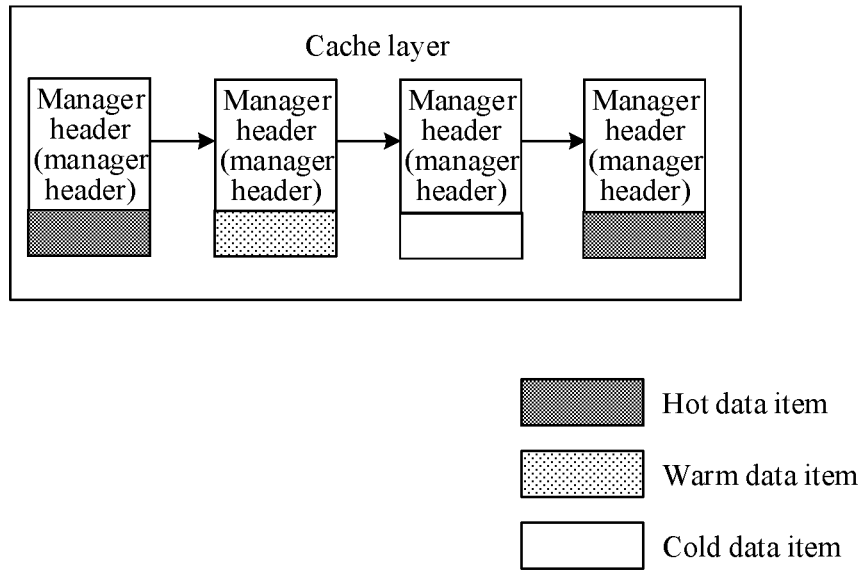
FIG. 1 is a schematic diagram of a scenario of a cache management policy.

Refer to FIG. 1. In a first implementation, data items enter a metadata cache area based on an access sequence, and the data items herein may be metadata. In the metadata cache area, cache management is performed at a granularity of a data item. Each data item has its own manager header, and the manager header may be used to record a hotness value of the data item. When data needs to be evicted from the data cache area, hotness values of a plurality of data items may be sorted, and a data item with a low hotness value is swapped out. In this manner, a high hit rate may be obtained. However, because the metadata is relatively small and there is a large amount of metadata, management overheads in this manner are high, and effective utilization of cache space is low.

Figure 2:
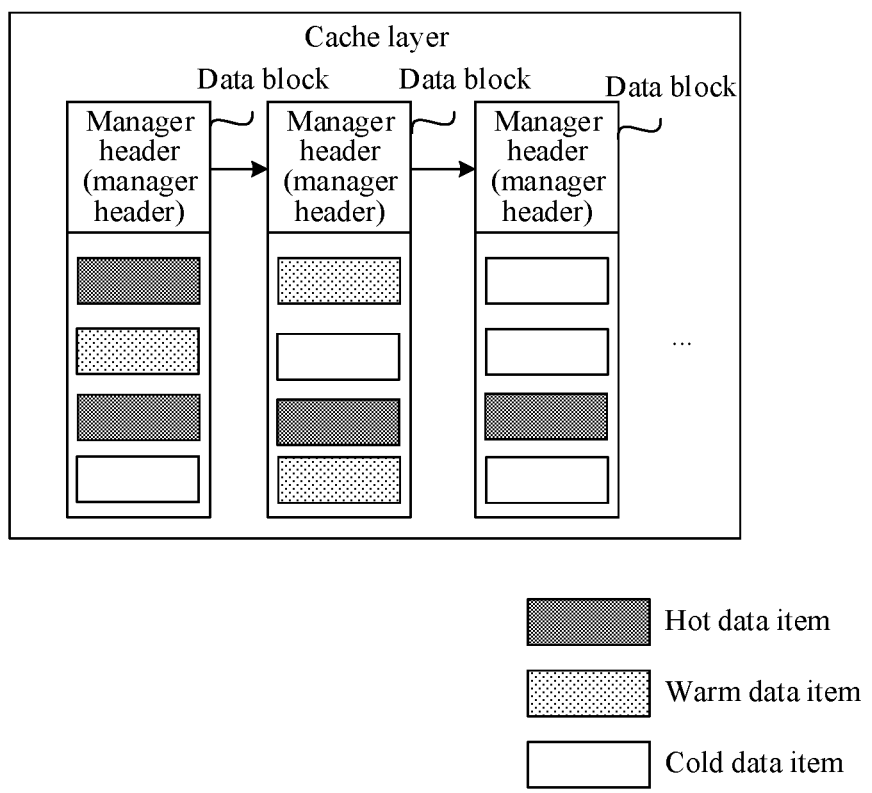
FIG. 2 is a schematic diagram of a scenario of another cache management policy.

Refer to FIG. 2. In another implementation, in a metadata cache area, management is performed at a granularity of a data block, and data items are inserted into the data block based on an access sequence. Each data block has its own manager header, and the manager header is used to record a hotness value of the entire data block. Subsequently, a swap-out operation may be performed based on the hotness value of the data block at the granularity of the data block. In this manner, management overheads are reduced, but hotness values of the data items cannot be sensed. This may result in a scenario where a data block that is swapped out is mixed with a cold data item and a hot data item, where the hot data item may be forced to be swapped out again, resulting in a low hit rate.

In conclusion, the current cache management policies both have disadvantages, and the high hit ratio and the management overheads cannot be considered (e.g., optimized) at the same time.

The following provides technical solutions of this application. For a better understanding of the technical solutions of this application, several application scenarios to which embodiments of this application are applicable are first described.

Figure 3:
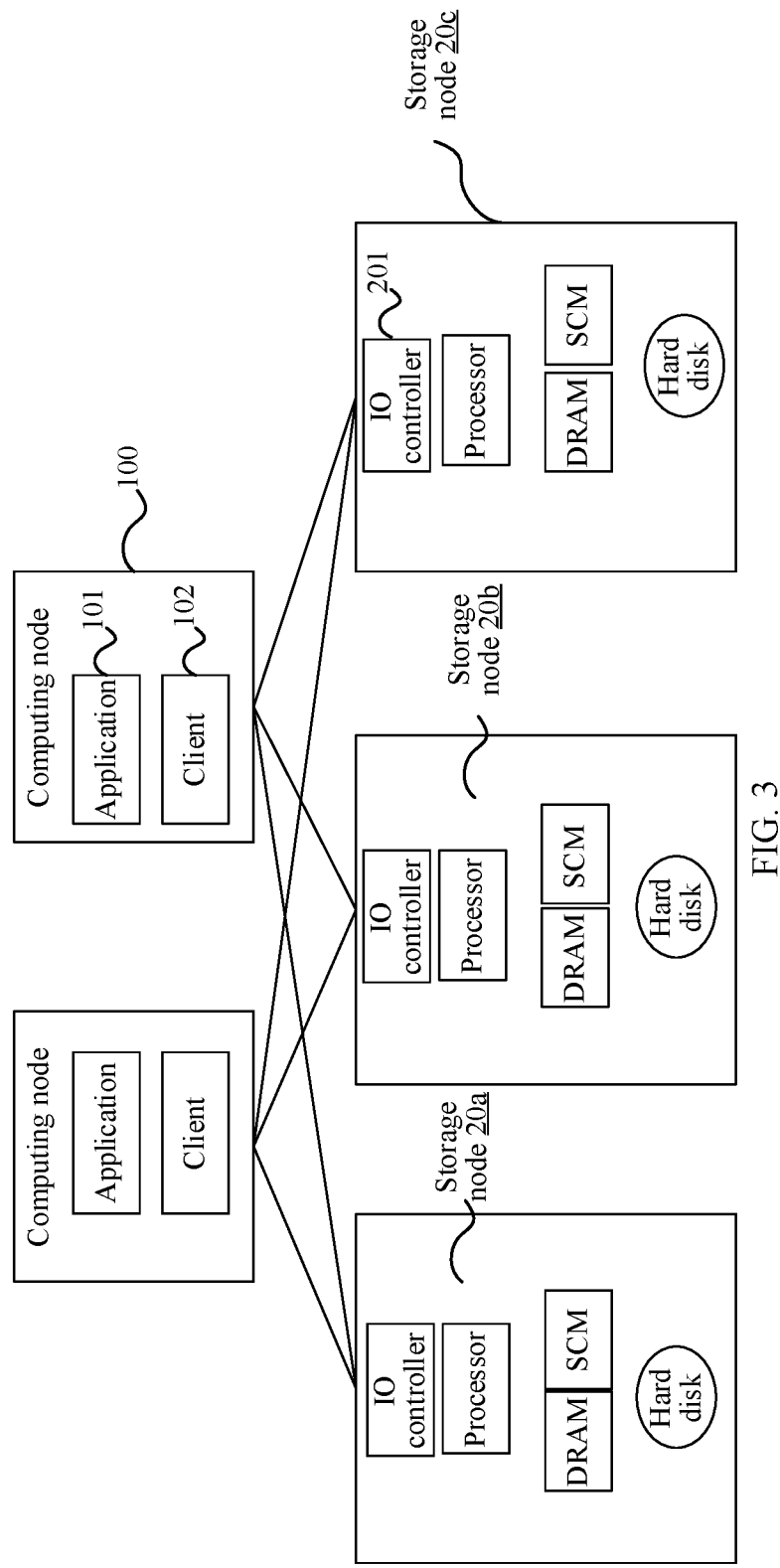
FIG. 3 is a schematic diagram of a system architecture of a storage system according to an embodiment.

Scenario 1:

FIG. 3 is a schematic diagram of an architecture of a storage system according to an embodiment of this application. The storage system includes a storage node cluster. A computing node cluster includes one or more computing nodes 100 (FIG. 3 shows two computing nodes 100, but there are not limited to the two computing nodes 100).

The computing node 100 is a computing device on a user side, for example, a server or a desktop computer. At a hardware layer, a processor and a storage (not shown in FIG. 3) are disposed in the computing node 100. At a software layer, an application program (application for short) 101 and a client program (client for short) 102 are run on the computing node 100. The application 101 is a general term for various applications presented to a user. The client 102 is configured to receive a data access request triggered by the application 101, interact with a storage node 20, and send the data access request to the storage node 20. The client 102 is further configured to receive data from the storage node, and forward the data to the application 101. It may be understood that, when the client 102 is a software program, functions of the client 102 are implemented by the processor included in the computing node 100 by running a program in the storage. The client 102 may alternatively be implemented by a hardware component located inside the computing node 100. Any client 102 in the computing node cluster may access any storage node 20 in the storage node cluster.

The storage node cluster includes one or more storage nodes 20 (FIG. 3 shows three storage nodes 20, but there are not limited to the three storage nodes 20), and the storage nodes may be interconnected with each other. The storage node is a server, a desktop computer, a controller or a disk enclosure in a storage array, or the like. In terms of its functions, the storage node 20 is configured to perform computation, processing, or the like onto data. In terms of the hardware, as shown in FIG. 3, the storage node 20 includes at least a processor, a storage, and an input/output (IO) controller 201. The processor 202 is a central processing unit (CPU), and is configured to process data from outside of the storage node 20 or data that is generated inside the storage node 20.

Figure 4:
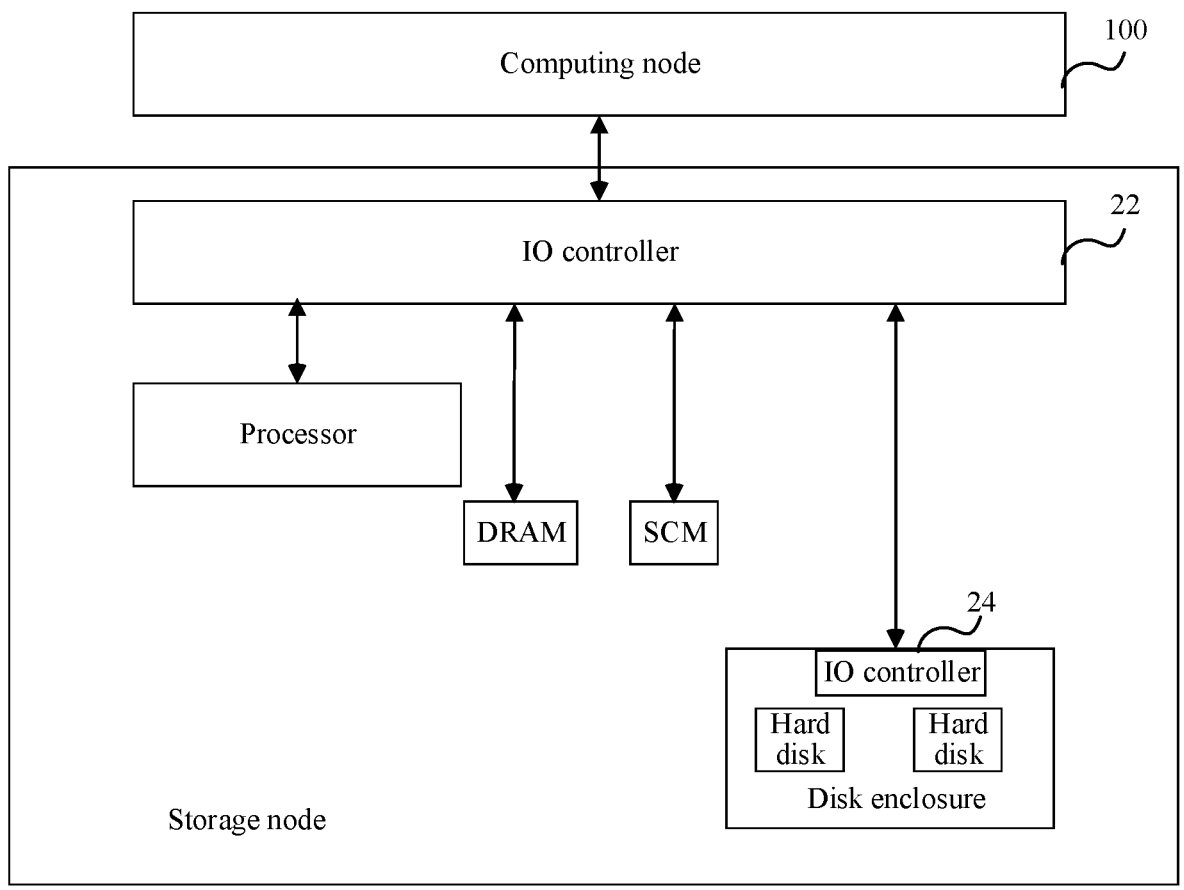
FIG. 4 is a schematic diagram of a structure of a storage node according to an embodiment.

The storage is an apparatus for storing data, and may be a memory or a hard disk. The memory is an internal memory that directly exchanges data with the processor. The memory can read/write the data at a fast speed at any time, and serves as a temporary data memory of an operating system or another running program. The memory includes at least two types of memories. For example, the memory may be a random access memory (RAM) or a read-only memory (ROM). For example, the RAM may be a dynamic random access memory (DRAM) or a storage class memory (SCM). The DRAM is a semiconductor memory, and is similar to most random access memories (RAMs), that is a volatile memory device. The SCM is a composite storage technology that combines both a conventional storage apparatus feature and a memory feature. The storage class memory can provide a higher read/write speed than the hard disk, but is slower than the DRAM in terms of an operation speed and more cost-effective than the DRAM in terms of costs. However, the DRAM and the SCM are merely examples for description in this embodiment. The memory may further include another random access memory, for example, a static random access memory (SRAM). For example, the read-only memory may be a programmable read-only memory (PROM) or an erasable programmable read-only memory (EPROM). In addition, the memory may alternatively be a dual in-line memory module (DIMM for short), namely, a module including a dynamic random access memory (DRAM). In FIG. 4 and the following descriptions, the DRAM and the SCM are used as examples for description, but this description does not indicate that the storage node may not include or is not another type of memory. Different than a memory 203, the hard disk has a lower read/write speed than that of the memory, and is usually configured to persistently store data. The storage node 20a is used as an example. One or more hard disks may be disposed inside the storage node 20a. Alternatively, one disk enclosure (as shown in FIG. 4) may alternatively be mounted outside the storage node 20a, and a plurality of hard disks are disposed in the disk enclosure. In any deployment manner, these hard disks may be considered as hard disks included in the storage node 20a. The hard disk is a solid-state disk (SSD), a mechanical hard disk, or another type of hard disk. Similarly, another storage node in the storage node cluster, such as a storage node 20b or a storage node 20c, may alternatively include various types of hard disks. One storage node 20 may include one or more storages of a same type.

FIG. 4 is a schematic diagram of an internal structure of a storage node 20. As shown in FIG. 4, in addition to a processor and a storage, the storage node 20 further includes an IO controller 22. For example, the IO controller includes a communication unit (e.g., communication circuit). The communication unit provides an efficient network transmission capability for external or internal communication. For example, the communication unit may be a network interface controller (NIC). First, each storage node 20 has its own IO controller 22 that is configured to communicate with a computing node 100, and is further configured to communicate with another storage node. The storage node 20 may receive an IO request from the computing node 100 via the IO controller 22, or send an IO request to the computing node 100 via the IO controller 22. Alternatively, the storage node 20 may send an IO request to a storage node 30 via the IO controller 22 or receive an IO request from a storage node 30 via the IO controller 22. Second, when each hard disk is located in a disk enclosure that is externally connected to the storage node 20, an IO controller 24 is disposed in the disk enclosure, the IO controller 24 is configured to communicate with the IO controller 22, and the hard disk may send data or instructions to the IO controller 22 via the IO controller 24. Alternatively, the hard disk may receive data or instructions sent by the IO controller 22 via the IO controller 24. In addition, the storage node 20 may further include a bus (not shown in FIG. 4), used for communication between components inside the storage node 20. A structure and a function of the IO controller 24 are similar to those of the IO controller 22, and are not described one by one herein again.

Scenario 2:

The storage node cluster shown in FIG. 3 further includes a management node (not shown in FIG. 3). The management node is configured to create and manage a memory pool and/or a storage pool. The storage nodes 20 elects a node from the storage nodes, and the node functions as a management node. The management node may communicate with any storage node 20. The memory pool and the storage pool of the storage system are shared by all the storage nodes of the storage system. In other words, the storage nodes may use any memory in the memory pool or use any memory in the storage pool.

Figure 5:
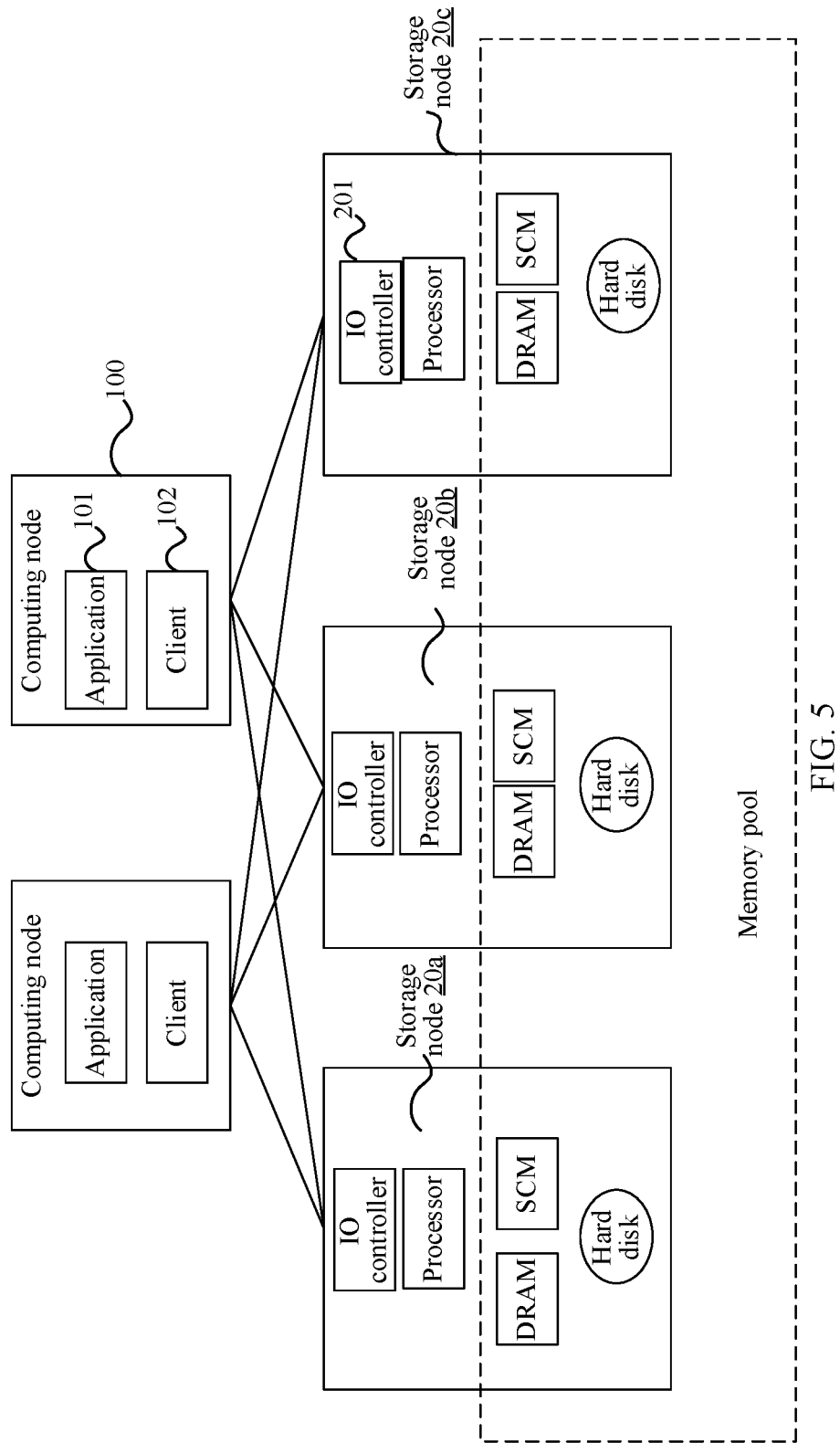
FIG. 5 is a schematic diagram of an architecture of a memory pool according to an embodiment.
Figure 6:
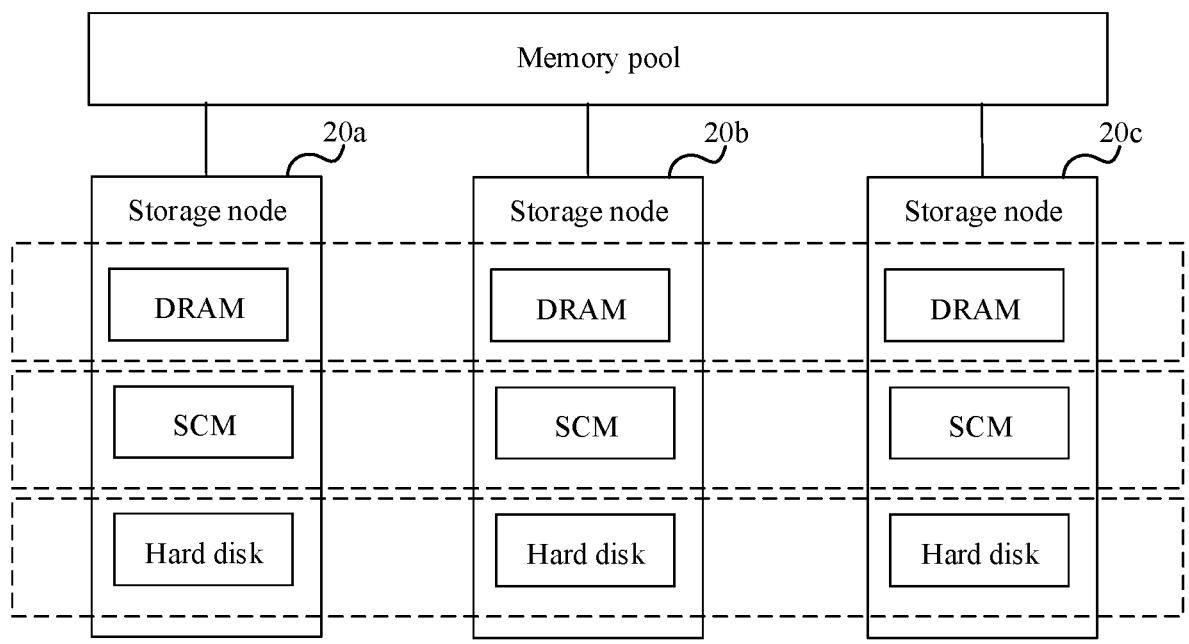
FIG. 6 is a schematic diagram of levels of memories included in a memory pool according to an embodiment.

The following description describes the memory pool provided in these embodiments. FIG. 5 is a schematic diagram of an architecture of a memory pool. The memory pool includes a plurality of different types of memories, and each type of memory may be considered as a level. The performance of a memory at each level is different than the performance of a memory at another level. The parameters that indicate a performance level of each memory in this application may consider aspects such as operation speed and/or an access latency. FIG. 6 is a schematic diagram of levels of memories included in a memory pool according to an embodiment. As shown in FIG. 6, the memory pool includes memories in each storage node 20. Because a DRAM has a highest performance in various types of memories, the DRAM in each storage node is located at a first level of the memory pool. Because performance of an SCM is worse than that of the DRAM, the SCM in each storage node is located at a second level of the memory pool. Further, because performance of a hard disk is worse than that of the SCM, the hard disk in each storage node is located at a third level of the memory pool.

Although FIG. 5 and FIG. 6 show only three types of memories, based on the foregoing descriptions, in application, a plurality of types of memories may be deployed inside the storage node 20. To be specific, various types of memories or hard disks may all be a part of the memory pool, and memories of a same type located on different storage nodes are at a same level in the memory pool. The type of the memory included in the memory pool and a quantity of layers are not limited in this application. The levels of the memory pool are merely internal division and are not sensed by an upper-layer application. It should be noted that, although the memories of the same type located on the storage nodes are at the same level, for a storage node, the performance of using a local DRAM of the storage node is better than the performance of using a DRAM of another storage node. Similarly, the performance of using a local SCM is better than the performance of using an SCM of another storage node, and so on. Therefore, when memory space at a level needs to be allocated, the storage node preferentially allocates local space at the level to a user, and when the local space is insufficient, the storage node allocates space from another storage node at a same level.

Figure 7:
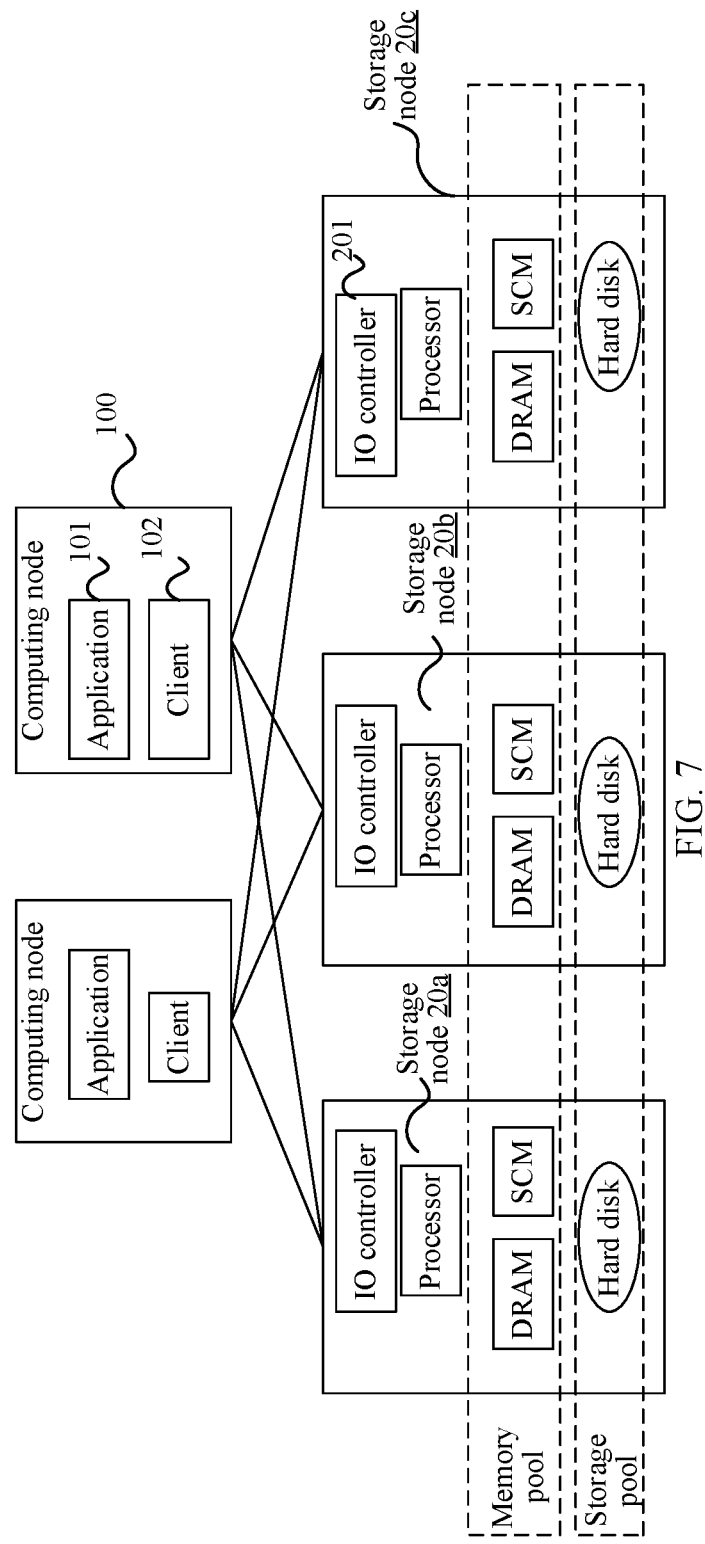
FIG. 7 is a schematic diagram of an architecture of a memory pool and a storage pool according to an embodiment.

The memory pool shown in FIG. 5 or FIG. 6 includes all types of memories in the storage node. However, in another implementation, as shown in FIG. 7, the memory pool may include only some types of memories. For example, the memory pool may only include memories with high performance, such as the DRAM and the SCM, and exclude memories with low performance, such as the hard disk. In an optional implementation, when the memory pool only includes memories with high performance (for example, the DRAM and the SCM) in the storage cluster, the management node may further construct memories with low performance (for example, the hard disks) in the storage cluster into a storage pool. Similar to the memory pool, the storage pool shown in FIG. 7 also includes at least two storage nodes, and storage space of the storage pool includes one or more types of hard disks in the at least two storage nodes. When the storage cluster includes both the memory pool and the storage pool, the storage pool is used to persistently store data, especially data that is less frequently accessed (e.g., cold data), and the memory pool is used to temporarily store data, especially data that is frequently accessed (e.g., hot data).

It should be noted that, in the memory pools shown in FIG. 5 to FIG. 7, not all the storage nodes in the storage node cluster need to contribute storage space to the memory pool, and the memory pool may cover only some storage nodes in the cluster. In some application scenarios, two or more memory pools may alternatively be created in the storage node cluster, each memory pool covers a plurality of storage nodes, and these storage nodes provide storage space for the memory pool. Storage nodes occupied by different memory pools may be repeated or may not be repeated. In conclusion, the memory pool in this embodiment is established by using the at least two storage nodes, and storage space included in the memory pool comes from at least two different types of memories. Similarly, for a manner of constructing the storage pool, refer to the descriptions of the memory pool. Details are not described herein again.

In creating a memory pool, each storage node 20 periodically reports status information of the memories to a management node through a heartbeat channel. One or more management nodes may be deployed. The management node may be deployed in the storage node cluster as an independent node, or may be jointly deployed with the storage node 20. In other words, one or more storage nodes 20 function as the management node. The status information of the memories includes but is not limited to: types of various memories included in the storage node, health statuses, or total capacity and available capacity of each type of memories. The management node creates the memory pool based on the acquired information. The creation of the memory pool means that storage space provided by the storage nodes 20 is centralized as the memory pool for a unified management. Therefore, physical space of the memory pool comes from various memories included in the storage nodes. However, in some scenarios, the storage node 20 may selectively provide a memory for the memory pool based on a status of the storage node 20, for example, a health status of the memory. In other words, it is possible that some memories in some storage nodes are not part of the memory pool. After acquiring the information, the management node needs to perform unified addressing on the storage space included in the memory pool. Through unified addressing, each segment of space of the memory pool has a unique global address. Space indicated by the global address is unique in the memory pool, and each storage node 20 knows a meaning of the address. After the physical space is allocated to a segment of space in the memory pool, a global address of the space has a corresponding physical address. The physical address indicates a memory of a storage node in which the space represented by the global address is actually located, and an offset in the memory, namely, a location of the physical space. For a manner of creating the storage pool, refer to the descriptions of creating the memory pool. Details are not described herein again.

Some embodiments may be applied to scenario 1 or scenario 2. In the network architecture shown in scenario 1, the storage device in this embodiment of this application may be any storage node in FIG. 3, for example, the storage node 20a. In this case, the first-level storage and the second-level storage may be local storages of the storage node 20a. For example, in FIG. 1, the first-level storage may be a DRAM, the second-level storage may be an SCM. For another example, the first-level storage may be an SCM, and the second-level storage may be a hard disk. For another example, the first-level storage may be a DRAM, and the second-level storage may be a hard disk. Certainly, as described above, the DRAM, the SCM, and the hard disk are merely used as an example for description herein, and it does not indicate that the storage node 20 does not include another type of storage. Types of the first-level storage and the second-level storage are not limited in this embodiment of this application. Accordingly, the first-level storage and the second-level storage may be any type of storage having different performances. Due to the limited examples, details are not further described herein again, and details are not described in subsequent descriptions.

Figure 8:
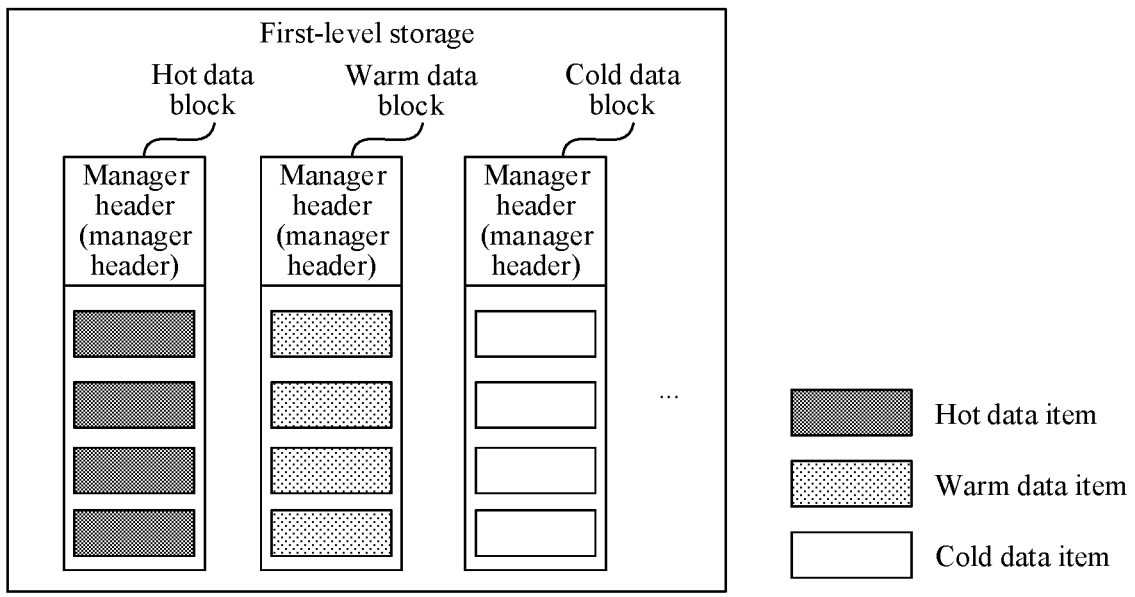
FIG. 8 is a schematic diagram of a structure of a first-level storage according to an embodiment.

In the network architecture shown in scenario 2, the storage device in some embodiments may be any storage node in FIG. 5 to FIG. 8, for example, the storage node 20a. In this case, the first-level storage and the second-level storage may be different levels of memories in the memory pool and/or the storage pool. For example, with reference to FIG. 6 or FIG. 7, the first-level storage may be a first level of memory (e.g., DRAM) in the memory pool, and the second-level storage may be a second level of memory (e.g., SCM) in the memory pool. Alternatively, the first-level storage may be a first level of memory (e.g., DRAM) in the memory pool, and the second-level storage may be a third level of memory (e.g., hard disk) in the memory pool. Alternatively, the first-level storage may be a second level of memory (e.g., SCM) in the memory pool, and the second-level storage may be a third level of memory (e.g., hard disk) in the memory pool. With reference to FIG. 8, the first-level storage may be a first level of memory (e.g., DRAM) in the memory pool, and the second-level storage may be a second level of memory (e.g., SCM) in the memory pool. Alternatively, the first-level storage may be a first level of memory (e.g., DRAM) in the memory pool, and the second-level storage may be a memory (e.g., hard disk) in the storage pool. Alternatively, the first-level storage may be a second level of memory (e.g., SCM) in the memory pool, and the second-level storage may be a memory (e.g., hard disk) in the storage pool.

It should be noted that, (1) in the foregoing scenario 1 or scenario 2, the storage node and the computing node may alternatively be integrated into a same physical device. In this embodiment, the integrated device is collectively referred to as a storage node. An application is deployed inside the storage node 20. Therefore, the application may directly trigger a write IO request or a read IO request via a client in the storage node 20, and the write IO request or the read IO request is processed by the storage node 20, or is sent to another storage node 20 for processing. In this case, the read/write IO request sent by the client to the local storage node 20 is a data access request sent by the client to the processor. In addition, components included in the storage node 20 and functions of the components are similar to those of any storage node 20 in FIG. 3 to FIG. 7. Details are not described herein again. (2) The storage nodes shown in FIG. 3 to FIG. 7 are merely an example. In actual application, compared with the storage nodes shown in FIG. 3 to FIG. 7, the storage device used in some embodiments may include more or fewer structures. For example, the storage device includes only a processor, a first-level storage (for example, a DRAM), and a second-level storage (for example, a hard disk). This is not limited in this embodiment of this application.

The following describes the technical solutions of this application with reference to specific accompanying drawings and embodiments.

FIG. 8 is a schematic diagram of a structure of a first-level storage according to an embodiment of this application. The first-level storage may be divided into at least two storage areas, for example, a first storage area and a second storage area. A size of each storage area may be preset, for example, 8 Kilobyte (KB) or 1 Megabyte (MB), and sizes of the storage areas may be the same or different. This is not limited in this embodiment of this application.

Hotness values of all pieces of data stored in the first storage area are within a first hotness value interval, and hotness values of all pieces of data stored in the second storage area are within a second hotness value interval. Data in a same storage area has the same or similar hotness values. When a swap-out operation is performed, the data in the first-level storage may be swapped out at a granularity of a storage area. In this way, a situation in which the swapped-out data is mixed with cold data and hot data can be avoided. In this way, management overheads are not increased while a high hit rate is achieved.

For example, both the first storage area and the second storage area may be data cache areas, metadata cache areas, or cache areas of another object. This is not limited in this embodiment of this application. The following uses the metadata cache area as an example to describe in detail a cache management method provided in this embodiment of this application.

With reference to FIG. 8, for example, the data stored in the first-level storage may be divided into a plurality of data blocks at a unit of the storage area, and one storage area stores one data block. For ease of description, the following examples uses the data block as an example for description. At least two data blocks in the plurality data blocks have different hotness levels, each hotness level is associated with one hotness value range, and different hotness levels correspond to different hotness value ranges.

In a possible implementation, each data block includes a manager header, and the manager header includes an identifier that is indicative of a hotness level of the data block and that is used to identify the hotness level of the data block. This manager header allows for storing data in a data block of a corresponding hotness level based on a hotness value of the data and hotness level ranges corresponding to different hotness levels. It should be understood that, after the data blocks are fully stored, a new data block with a same hotness level is obtained by dividing an empty storage space from the first-level storage to store new data. That is, the first-level storage may include a plurality of data blocks of a same hotness level. In another possible implementation, the manager header may further include a hotness value of the data block. When a swap-out operation is performed, data blocks that are fully stored may be sorted based on hotness values, and a data block with a relatively low hotness value is swapped out from the data blocks that are fully stored.

Figure 9:
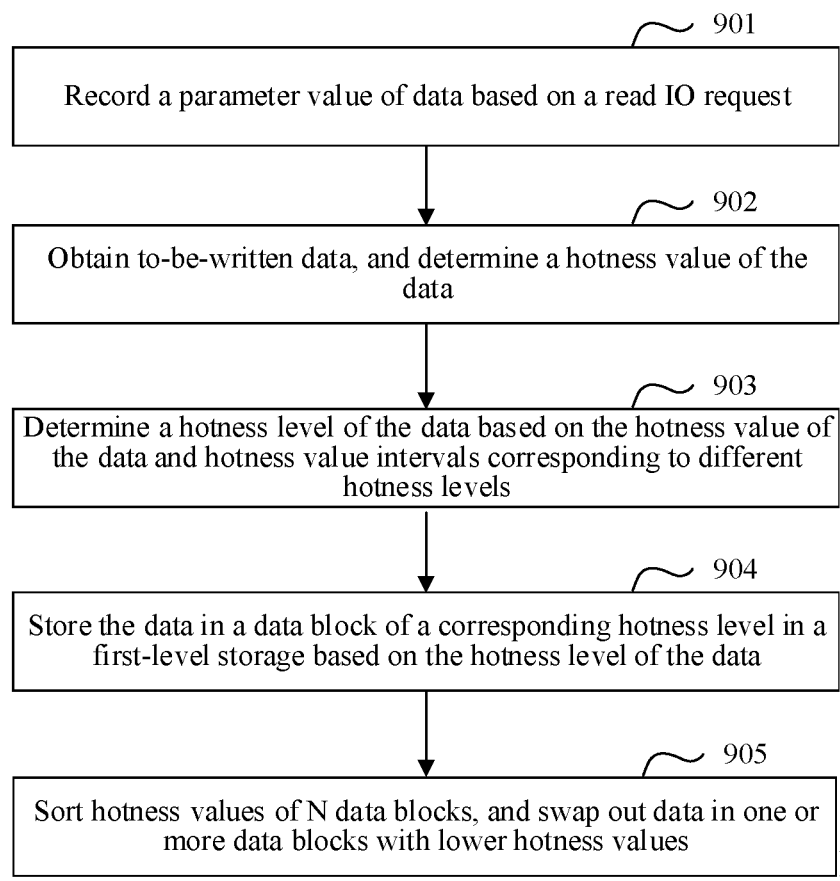
FIG. 9 is a schematic flowchart corresponding to a cache management method according to an embodiment.
Figure 10:
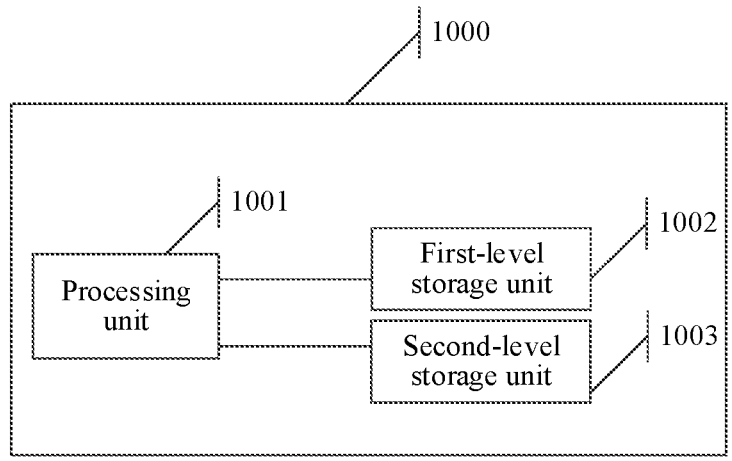
FIG. 10 is a schematic diagram of a structure of a storage device according to an embodiment of this application.

FIG. 9 is a schematic flowchart of a cache management method according to an embodiment of this application. In this embodiment, an example in which a first-level storage includes data blocks of different hotness levels is used for description. As shown in FIG. 10, the method includes the following steps.

Step 901: Record a parameter value of data based on a read IO request in a process of accessing the data.

For example, a storage device records an identifier and the parameter value of the data, and the parameter value may be used to calculate a hotness value of the data. In other words, the parameter value may include, but is not limited to one or more of the following: an access frequency, access time, a data size, a data validity period, or data priority information.

For an update of the access frequency, for example, assuming that the data to be accessed is first data, each time the storage device receives a read IO request for the first data, an access frequency value of the first data is increased by 1. For an update of the access time, for example, only the latest access time of the first data may be recorded. For example, the access time of the data is updated based on a timestamp of a latest read IO request. In other words, each time a new read IO request of first data is received, access time of the first data is updated to a timestamp of the new read IO request. For another example, access time of each read IO request in a plurality of read IO requests in a time period may alternatively be stored. The data priority information is used to identify a priority of data, and may be used to configure data that has a high importance requirement but may be accessed less frequently.

Step 902: Obtain to-be-written data, and determine a hotness value of the data.

For example, the to-be-written data may be data written by the storage device for the first time or data obtained from a storage of another level. For example, data is originally stored in a first-level storage and is subsequently swapped out, but as a hotness value of the data increases, the data may be swapped in the first-level storage again.

The following provides several manners of determining the hotness value.

In an implementation, the hotness value is calculated based on one or more parameter values in step 901. For example, each parameter value is assigned with a weight. When a hotness value of data is calculated, weighted summation is performed on each parameter value of the data where a weight corresponds to each parameter value, and the weighted sum is the hotness value of the data. For another example, a time period is divided into a plurality of time periods based on a preset duration, a different weight is assigned to an access frequency in each time period based on a sequence of the time periods, and weighted summation is performed based on all the access frequencies in the preset time period, where the weights correspond to the access frequencies. The weighted sum may then be used to determine the hotness value of the data. In the foregoing calculation manner, the hotness value of the data may be calculated from a plurality of dimensions. For data whose hotness value fluctuates with time, the hotness value of the current data may be calculated dynamically and more accurately.

In another possible implementation, in this embodiment of this application, the hotness value of the data may be further determined by using a machine learning model. This is not limited in some embodiments. For ease of description, in subsequent descriptions, a value of the access frequency of the data may be used as the hotness value of the data, and this is used as an example for description.

It should be noted that there is no strict time sequence limitation on step 901 and step 902, and the two steps are performed independent of each other. For example, step 901 and step 902 may be performed synchronously. This is not limited in this embodiment of this application.

Step 903: Determine a hotness level of the data based on the hotness value of the data and hotness value intervals corresponding to different hotness levels.

For example, it is assumed that the hotness levels of the data blocks in the first-level storage include "cold", "warm", and "hot", and identifiers of the hotness levels may each be represented by using at least two bits. For example, 00 may be used to identify the hotness level "cold", 01 may be used to identify the hotness level "warm", and 10 may be used to identify the hotness level "hot". In the following, a data block whose hotness level is cold is referred to as a cold data block, a data block whose hotness level is warm is referred to as a warm data block, and a data block whose hotness level is hot is referred to as a hot data block.

Specifically, the cold data block is associated with a cold interval, the warm data block is associated with a warm interval, and the hot data block is associated with a hot interval. Herein, the cold interval, the warm interval, and the hot interval all refer to a hotness value range. In FIG. 8, data whose hotness value is in the hot interval is denoted as a hot data item, data whose hotness value is in the warm interval is denoted as a warm data item, and data whose hotness value is in the cold interval is denoted as a cold data item. For example, the hotness value of the data may be the access frequency of the data. In this case, the cold interval may be an access frequency range [0, 5], the warm interval is an access frequency range [6, 10], and the hot interval is an access frequency range (10, ∞). Certainly, these values are merely examples, and a specific value of a hotness value range corresponding to each hotness level is not limited to these embodiments.

When the hotness value of the to-be-written data is in the cold interval, the data is denoted as the hotness level "cold" (represented by the hotness level identifier 00). When the hotness value of the to-be-written data is in the warm interval, the data is denoted as the hotness level "warm" (represented by the hotness level identifier 01). The rest may be deduced by analogy.

Step 904: Store the data in a data block of a corresponding hotness level in the first-level storage based on the hotness level of the data.

Step 905: Sort hotness values of N data blocks and swap out data in one or more data blocks with lower hotness values.

A manager header of each data block further includes a parameter value of the data block. The parameter value includes but is not limited to one or more of the following: an access frequency or access time, where the access frequency is a total frequency of accessing all data items in the data block. The access time may be latest access time of the data block or may be an access time record within a time period.

For a manner of calculating a hotness value of the data block based on the parameter value of the data block, refer to related descriptions of the foregoing step 902. Details are not described herein again. For example, an example in which the hotness value of the data block is a total access frequency of data in the data block is used. In the process of accessing the data, when a data item in the data block is accessed, the hotness value of the data block is updated.

When a data block needs to be swapped out, in a possible implementation, all the data blocks in the first-level storage are sorted based on hotness values, and one or more data blocks whose hotness values are less than a preset threshold or that are arranged at a tail are swapped out. In another implementation, all data blocks with lower hotness levels may be obtained. For example, all cold data in the first-level storage is sorted based on hotness values of data blocks, and one or more cold data blocks whose hotness values are less than a preset threshold or that are arranged at a tail are swapped out. The swap-out of the data may be that the data is evicted, that the data is deleted or that the data may be swapped out to a next level of storage. For example, a swap-out operation of a data item performed in a DRAM may be that the data item may be written into an SCM. This is not limited in some embodiments.

In the foregoing manner, data items with the same or similar hotness values may be stored in a same data block. This may avoid a case in which the data block is mixed with both cold hot and hot data. In addition, swap-out may be performed at a granularity of the data block, to reduce management overheads, and data that is swapped out is not mixed with cold data and hot data, to improve a hit rate.

It should be noted that, after the first data is stored in a data block of a corresponding hotness level, for example, in a cold data block, a hotness value of the first data may increase, and an increased hotness value may result in a hot interval. Therefore, a processing manner after the data is stored in a cache layer is used herein. During use, whether the to-be-accessed data can be hit at the cache layer is a consideration, and which data block is hit is not a consideration. Therefore, in a possible implementation, the data in the first-level storage may not be migrated between the data blocks in order to save computing resources. In this case, the data may be swapped out with the cold data block. Because the hotness value of the data is high, an access request for the data may be subsequently received again. In this case, the data may be swapped from another storage to a hot data block of the first-level storage.

In another possible implementation, data in different data blocks in the first-level storage may be migrated to each other. For example, after the first data is stored in a cold data block, the first data may be migrated to a hot data block when it is detected that a hotness value of the first data is in the hot interval. Alternatively, the first data is then migrated to a cold data block when it is detected that a hotness value of the first data in a hot data block changes to be in the cold interval. In this design, the data block in which the data is located may be dynamically adjusted based on the hotness value of the data. This avoids a scenario where the swapped out data is mixed with cold data and hot data as time changes, and a hit rate may be further improved.

In the foregoing embodiments provided in this application, to implement functions in the method provided in embodiments of this application, a storage system may include a hardware structure and/or a software module, and the functions are implemented by using the hardware structure, the software module, or a combination of the hardware structure and the software module. Whether a function in the foregoing functions is performed by using the hardware structure, the software module, or the combination of the hardware structure and the software module depends on particular applications and design constraint conditions of the technical solutions.

FIG. 10 is a schematic diagram of a structure of a storage device 1000. The storage device may be inserted on any storage node, for example, a storage node 20*a*, in the systems shown in FIG. 3 to FIG. 7, or may be located in any storage node that is configured to implement a function of the storage node. The storage device 1000 may be a hardware structure or a hardware structure plus a software module.

As shown in FIG. 10, the storage device 1000 includes a processing unit 1001, a first-level storage unit 1002 (e.g., first-level storage circuit), and a second-level storage unit 1003 (e.g., second-level storage circuit). A speed of processing data by the first-level storage unit 1002 is higher than that of the second-level storage unit 1003.

The first-level storage unit 1002 is configured to provide at least two storage areas. The at least two storage areas include a first storage area and a second storage area. The hotness values of all pieces of data stored in the first storage area are within a first hotness value interval, hotness values of all pieces of data stored in the second storage area are within a second hotness value interval, and the first hotness value interval is different from the second hotness value interval. For details, refer to an internal structure of the first-level storage shown in FIG. 8.

The processing unit 1001 is configured to swap out the data in the first-level storage at a granularity of one storage area.

In a possible implementation, the processing unit 1001 is configured to obtain first data, and determine a first hotness value of the first data. When the first hotness value is within the first hotness value interval, the processing unit 1001 is further configured to store the first data in the first storage area. When the first hotness value is within the second hotness value interval, the processing unit 1001 is further configured to store the first data in the second storage area.

In a possible implementation, the processing unit 1001 is configured to determine a second hotness value of each of N storage areas, where N is a positive integer, and the N storage areas are some or all storage areas currently obtained through division in the first-level storage. The processing unit 1001 is further configured to determine at least one storage area from the N storage areas, where a second hotness value of the at least one storage area is less than a preset threshold. Alternatively, the second hotness value of the at least one storage area is less than a second hotness value of another storage area, and the other storage area is a storage area other than the at least one storage area in the N storage areas. The processing unit 1001 is further configured to swap out data in the at least one storage area.

In a possible implementation, each storage area includes a first data structure, the first data structure includes an access parameter record, and the access parameter record is updated when data in the storage area is accessed. When determining the second hotness value of the storage area, the processing unit 1001 is configured to obtain an access parameter record of any storage area, and determine the second hotness value based on the obtained access parameter record, where the access parameter record includes one or more of the following: a total access frequency or access time of data in the storage area.

In a possible implementation, when determining the first hotness value of the first data, the processing unit 1001 is configured to obtain a parameter value that is of the first data and that is recorded in a historical data record, where the parameter value includes one or more of the following: an access frequency, access time, a data size, a data validity period, or data priority information. The processing unit 1001 is further configured to perform an operation based on a preset algorithm and the parameter value, and use an operation result as the first hotness value.

Figure 11:
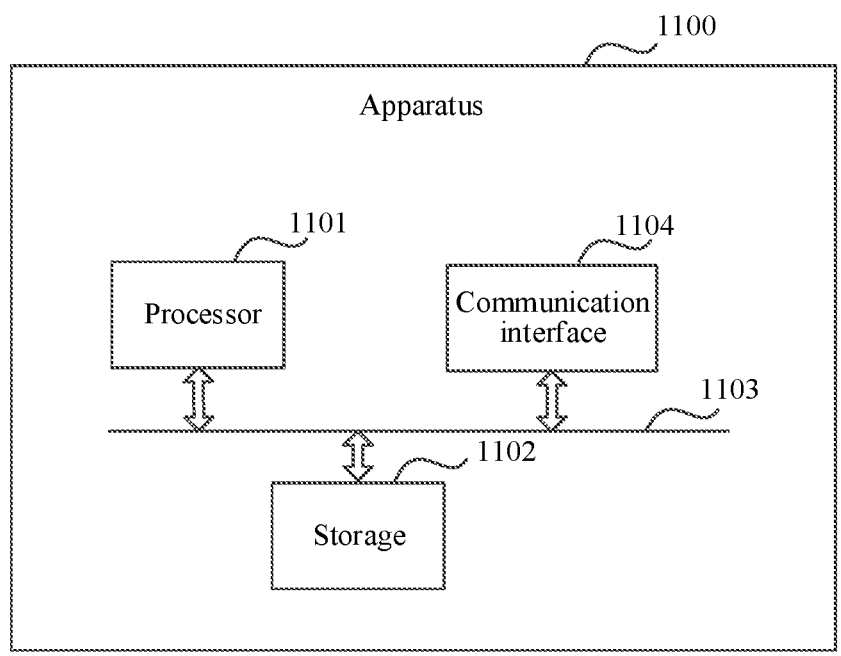
FIG. 11 is a schematic diagram of a structure of another storage device according to an embodiment of this application.

Similar to the foregoing concept, as shown in FIG. 11, this application provides an apparatus 1100. The apparatus 1100 may be inserted on any storage node, for example, a storage node 20*a*, in the systems shown in FIG. 3 to FIG. 7, and perform steps performed by an execution body in the method shown in FIG. 9.

The apparatus 1100 may include a processor 1101 and a storage 1102. Further, the apparatus may further include a communication interface 1104. The communication interface may be a transceiver or a network adapter. Further, the apparatus 1100 may further include a bus system 1103.

The processor 1101, the storage 1102, and the communication interface 1104 may be connected via the bus system 1103. The storage 1102 may be configured to store instructions. The processor 1101 may be configured to execute the instructions stored in the storage 1102, to control the communication interface 1104 to receive or send a signal in order to complete the steps performed by the execution body in the method shown in FIG. 9.

The storage 1102 may be integrated into the processor 1101, or the storage 1102 and the processor 1101 may be different physical entities.

In an implementation, it may be considered that a function of the communication interface 1104 is implemented by using a transceiver circuit or a transceiver-dedicated chip. It may be considered that the processor 1101 is implemented by using a dedicated processing chip, a processing circuit, a processor, or a general-purpose chip.

In another implementation, it may be considered that a computer is used to implement a function of a first computing node or a first computing node provided in this embodiment of this application. To be specific, program code for implementing the functions of the processor 1101 and the communication interface 1104 is stored in the storage 1102, and a general-purpose processor may implement the functions of the processor 1101 and the communication interface 1104 by executing the code in the storage.

For concepts, explanations, detailed descriptions, and other steps of the apparatus 1100 that are related to the technical solutions provided in this application, refer to the descriptions of the content in the foregoing methods or other embodiments. Details are not described herein again.

In an example of this application, the apparatus 1100 may be configured to perform the steps performed by the execution body in the foregoing procedure shown in FIG. 9. For example, first data is obtained, and a hotness value of the first data is determined. When the first hotness value is within the first hotness value interval, the first data is stored in the first storage area. When the first hotness value is in the second hotness value interval, the first data is stored in the second storage area. For another example, data in a first-level storage is swapped out at a granularity of a storage area.

For descriptions of the processor 1101 and the communication interface 1104, refer to the descriptions of the foregoing procedure shown in FIG. 9. Details are not described herein again.

Optionally, computer-executable instructions in some embodiments may also be referred to as application program code. This is not limited in this embodiment of this application.

Persons of ordinary skill in the art may understand that various numbers such as "first" and "second" in this application are merely used for differentiation for ease of description, and are not used to limit the scope of embodiments of this application or represent a sequence. "And/or" describes an association relationship between associated objects and indicates that three relationships may exist. For example, A and/or B may indicate the following three cases: Only A exists, both A and B exist, and only B exists. The character "/" usually indicates an "or" relationship between the associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. "A plurality of" means two or more, and another quantifier is similar to this. In addition, an element that appears in singular forms "a", "an", and "the" does not mean "one or only one" unless otherwise specified in the context, but means "one or more". For example, "a device" means one or more such devices.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure, or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions via a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by using a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an electrically erasable programmable ROM (EEPROM) memory, a register, a hard disk, a removable magnetic disk, a CD-ROM, or a storage medium in any other form in the art. For example, the storage medium may be connected to a processor so that the processor may read information from the storage medium and write information to the storage medium. Alternatively, the storage medium may be integrated into the processor. The processor and the storage medium may be disposed in the ASIC.

These computer program instructions may alternatively be loaded onto the computer or another programmable data processing device, so that a series of operations and steps are performed on the computer or the other programmable device, thereby generating computer-implemented processing. Therefore, the instructions executed on the computer or the other programmable device provide steps for implementing a specific function in one or more procedures in the flowcharts and/or in one or more blocks in the block diagrams.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations, or equivalents that cover the scope of this application. It is clear that persons skilled in the art can make various modifications and variations to this application without departing from the scope of this application. In this way, this application is intended to cover these modifications and variations of this application provided that they fall within the scope of the claims of this application and their equivalent technologies.

What is claimed is:

1. A storage device comprising a processor and at least two levels of storages, wherein the at least two levels of storages comprise a first-level storage and a second-level storage, and a speed of processing data by the first-level storage is higher than that of the second-level storage;
the first-level storage comprises at least a first storage area and a second storage area, wherein the first storage area stores multiple first data items, and hotness values of the multiple first data items stored in the first storage area are within a first hotness value interval, the second storage area stores multiple second data items, and hotness values of the multiple second data items stored in the second storage area are within a second hotness value interval, and the first hotness value interval is different than the second hotness value interval; and
the processor is configured to swap out data in the first-level storage at a granularity of one storage area based on the hotness values of the data; wherein the swapping out of the data in the first level storage at a granularity of one storage area based on the hotness values of the data comprises swapping out all the first data items stored in the first storage area from the first level storage into the second-level storage based on the hotness values of the multiple first data items or swapping out all the second data items stored in the second storage area from the first level storage into the second-level storage based on the hotness values of the multiple second data items.

2. The storage device according to claim 1, wherein:
the processor is further configured to obtain first data from the multiple first data items, and determine a first hotness value of the first data; and
when the first hotness value is within the first hotness value interval, store the first data in the first storage area; or
when the first hotness value is within the second hotness value interval, store the first data in the second storage area.

3. The storage device according to claim 2, wherein when determining the first hotness value of the first data, the processor is configured to:
obtain a parameter value of the first data that is recorded in a historical data record, wherein the parameter value comprises one or more of the following: an access frequency, access time, a data size, a data validity period, or data priority information; and
perform an operation based on a preset algorithm and the parameter value to utilize an operation result as the first hotness value.

4. The storage device according to claim 1, wherein when swapping out the data in the first-level storage at the granularity of the one storage area, the processor is configured to:
- determine a second hotness value of each of N storage areas, wherein N is a positive integer, and the N storage areas are some or all storage areas in the first-level storage;
- determine at least one storage area from the N storage areas, wherein a second hotness value of the at least one storage area is less than a preset threshold or the second hotness value of the at least one storage area is less than a second hotness value of another storage area, and the other storage area is a storage area other than the at least one storage area in the N storage areas; and
- swap out data in the at least one storage area.

5. The storage device according to claim 4, wherein each storage area of the at least one storage area comprises a first data structure, the first data structure comprises an access parameter record, and the access parameter record is updated when data in the storage area is accessed; and
- when determining the second hotness value of each of the N storage areas, the processor is configured to:
- obtain an access parameter record of any storage area, and
- determine the second hotness value based on the obtained access parameter record, wherein the access parameter record comprises one or more of the following: a total access frequency or access time of data in the storage area.

6. A cache management method comprising:
- providing at least two levels of storages, wherein the at least two levels of storages comprise a first-level storage and a second-level storage, and a speed of processing data by the first-level storage is higher than that of the second-level storage;
- providing at least a first storage area and a second storage area, wherein both the first storage area and the second storage area fall within the first-level storage, the first storage area stores multiple first data items, and hotness values of the multiple first data items stored in the first storage area are within a first hotness value interval, the second storage area stores multiple second data items, and hotness values of the multiple second data items stored in the second storage area are within a second hotness value interval, and the first hotness value interval is different than the second hotness value interval; and
- swapping out data in the first-level storage at a granularity of one storage area based on the hotness values of the data in the first-level storage;
- wherein the swapping out of the data in the first level storage at a granularity of one storage area based on the hotness values of the data comprises swapping out all the first data items stored in the first storage area from the first level storage into the second-level storage based on the hotness values of the multiple first data items or swapping out all the second data items stored in the second storage area from the first level storage into the second-level storage based on the hotness values of the multiple second data items.

7. The method according to claim 6, wherein the method further comprises:
- obtaining first data from the multiple first data items, and determining a first hotness value of the first data; and
- when the first hotness value is within the first hotness value interval, storing the first data in the first storage area; or
- when the first hotness value is within the second hotness value interval, storing the first data in the second storage area.

8. The method according to claim 7, wherein the determining of the first hotness value of the first data comprises:
- obtaining a parameter value of the first data that is recorded in a historical data record, wherein the parameter value comprises one or more of the following: an access frequency, access time, a data size, a data validity period, or data priority information; and
- performing an operation based on a preset algorithm and the parameter value to utilize an operation result as the first hotness value.

9. The method according to claim 6, wherein the swapping out the data in the first- level storage at a granularity of one storage area comprises:
- determining a second hotness value of each of N storage areas, wherein N is a positive integer, and the N storage areas are some or all of storage areas in the first-level storage;
- determining at least one storage area from the N storage areas, wherein a second hotness value of the at least one storage area is less than a preset threshold or the second hotness value of the at least one storage area is less than a second hotness value of another storage area, and the other storage area is a storage area other than the at least one storage area in the N storage areas; and
- swapping out data in the at least one storage area.

10. The method according to claim 9, wherein each storage area of the at least one storage area comprises a first data structure, the first data structure comprises an access parameter record, and the access parameter record is updated when data in the storage area is accessed; and
- the determining of the second hotness value of each of the N storage areas comprises:
- obtaining an access parameter record of any storage area, and determining the second hotness value based on the obtained access parameter record, wherein the access parameter record comprises one or more of the following: a total access frequency or access time of data in the storage area.

11. The method according to claim 6, wherein the method is applied to a storage device.

12. A storage apparatus that comprises a processor and a storage communicatively coupled to the processor, the processor being configured to implement the method according to claim 6.

13. A non-transitory computer-readable storage medium that stores program instructions, the computer-readable storage medium being communicatively coupled to a processor, wherein when the program instructions are executed by the processor, the processor being configured to implement the method according to claim 6.

14. A chip system that comprises a processor and a storage communicatively coupled to the processor, the processor being configured to implement the method according to claim 6.

* * * * *

UNITED STATES PATENT AND TRADEMARK OFFICE
CERTIFICATE OF CORRECTION

PATENT NO. : 12,399,828 B2
APPLICATION NO. : 18/470138
DATED : August 26, 2025
INVENTOR(S) : Weijie Xiang et al.

Page 1 of 1

It is certified that error appears in the above-identified patent and that said Letters Patent is hereby corrected as shown below:

In the Claims

In Column 18, Claim 1, Line 21, delete "second- level" and insert -- second-level --, therefor.

In Column 18, Claim 1, Line 37, delete "first level storage" and insert -- first-level storage --, therefor.

In Column 18, Claim 1, Lines 40-41, delete "first level storage" and insert -- first-level storage --, therefor.

In Column 18, Claim 1, Line 44, delete "first level storage" and insert -- first-level storage --, therefor.

In Column 19, Claim 6, Lines 52-53, delete "first level storage" and insert -- first-level storage --, therefor.

In Column 19, Claim 6, Line 55, delete "first level storage" and insert -- first-level storage --, therefor.

In Column 19, Claim 6, Line 59, delete "first level storage" and insert -- first-level storage --, therefor.

In Column 20, Claim 9, Line 19, delete "first- level" and insert -- first-level --, therefor.

Signed and Sealed this
Thirtieth Day of December, 2025

John A. Squires
*Director of the United States Patent and Trademark Office*